May 19, 1931. J. G. KING 1,805,700
REFRIGERATING APPARATUS
Original Filed Oct. 23, 1923  2 Sheets-Sheet 2
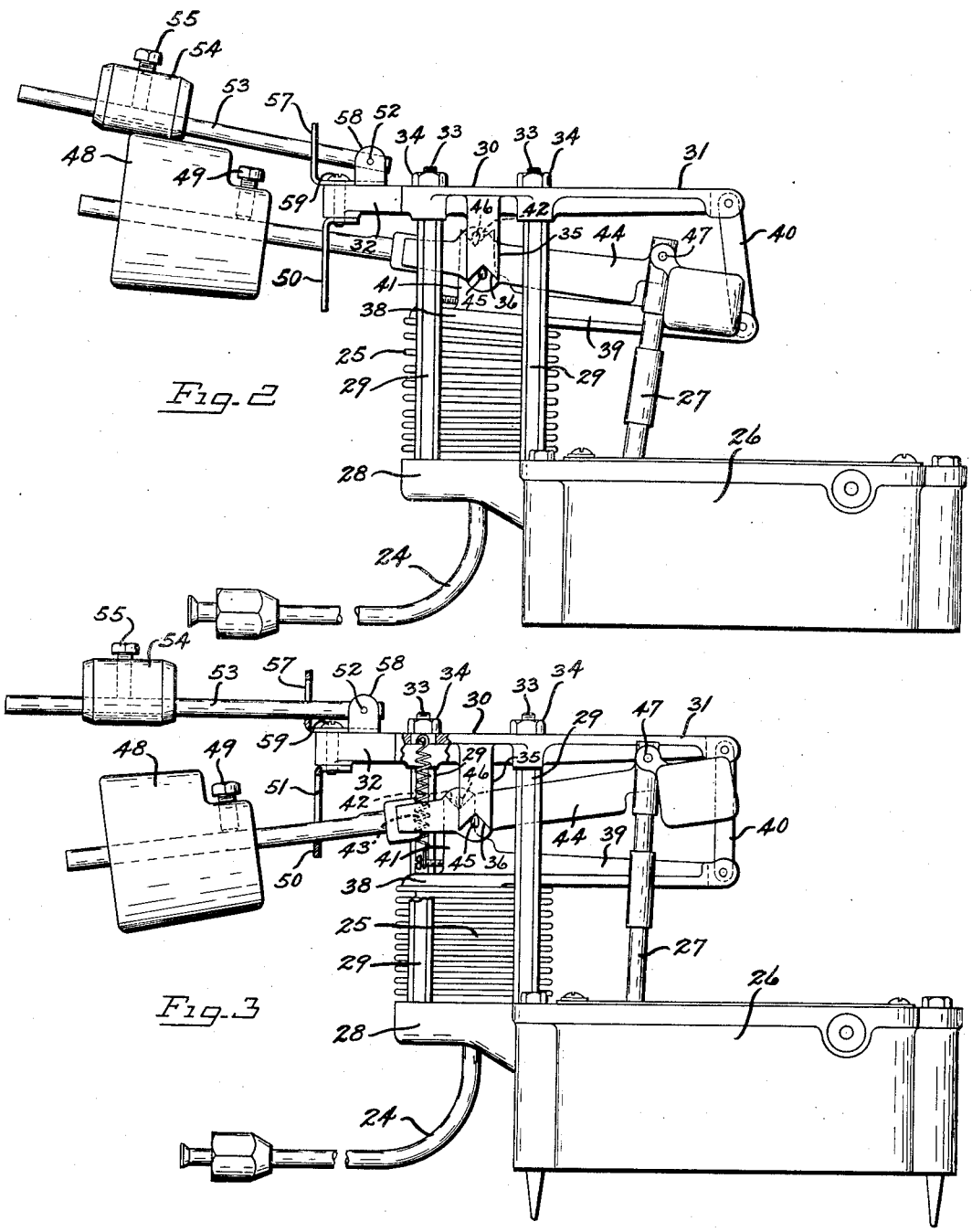
Inventors
Jesse G. King
By Spencer, Sawall & Hardman
Their Attorneys Patented May 19, 1931 1,805,700

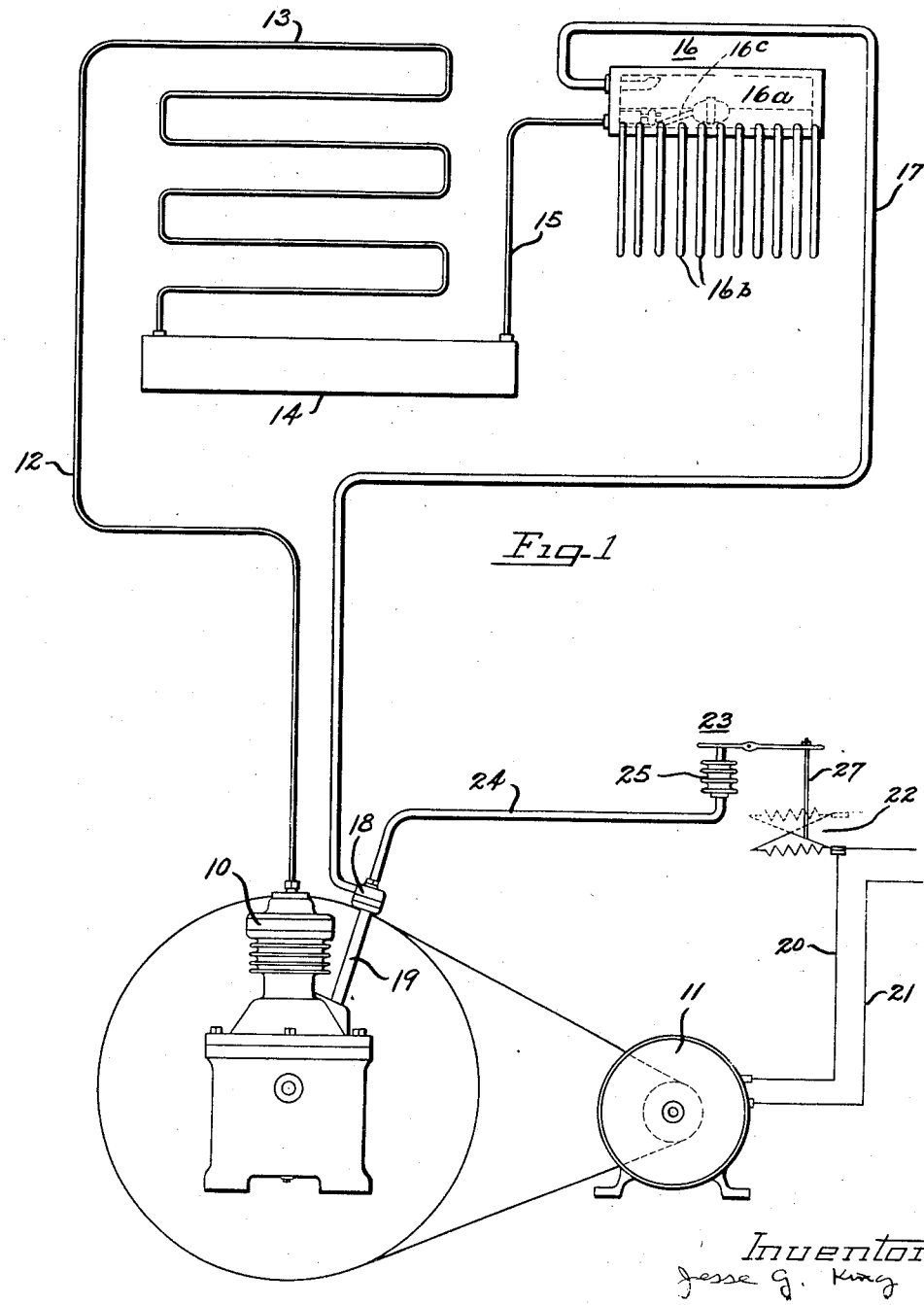

UNITED STATES PATENT OFFICE

JESSE G. KING, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed October 23, 1923, Serial No. 670,357. Renewed May 2, 1928.

This invention relates to automatic controlling mechanism, and more particularly to means for automatically stopping or starting the compressor of a refrigerating apparatus of the compressor-condenser-expander circuit type.

An object of the invention is to enable the stopping and starting to be automatically accomplished by different degrees of pressure, and particularly to enable one limit of actuating pressure to be changed without changing the other, as for example, to change the limit of high pressure at which the compressor will be started while maintaining the lower pressure limit at which the compressor will be stopped the same.

As there is a direct connection between the temperature and pressure of gases, the pressure of a volatile fluid or of a vapor in a thermostatic tube, or the pressure of the refrigerant vapor in the circulating system can be utilized to control the operations of the compressor of a refrigerating apparatus, so that the compressor can be automatically started at a predetermined relatively high temperature and automatically stopped at a predetermined relatively low temperature with the result that the inside of a refrigerating cabinet may be kept at any desired average low temperature. By means of this invention the differential between the upper and lower limits of temperature within a cabinet may be varied at will. That is, for example, the compressor may be made to start automatically at say, 28° F., 32° F., 36° F. or any desired temperature that is practicable, and stopped automatically at say, 4° F., 6° F. or 10° F. And by means of this invention one limit may be changed without changing the other.

A means for achieving a similar result is described and illustrated in an application filed by Jesse G. King, May 30, 1923, Serial No. 642,368; this application discloses and claims a means that is specifically different.

In the accompanying drawings, in which like reference characters indicate like parts throughout the several views, Fig. 1 is a diagram of a refrigerating machine of the compressor-condenser-expander type showing the application thereto of the controlling means which is the subject of this application. Fig. 2 is a side elevation of the controlling means with the movable parts thereof in the position assumed when the compressor is started; and Fig. 3 is a side elevation of the controlling means with the movable parts thereof in the position assumed when the compressor is stopped.

In Fig. 1, 10 represents, diagrammatically, a compressor; 11 a prime mover therefor, which may be an electric motor; 12 the liquid line or high pressure refrigerant conductor leading from the high pressure side of the pistons of the compressor; 13 a condenser in said high pressure line; 14 a receiver for liquefied refrigerant discharged from the condenser, and 15 a conduit leading from the receiver 14 to an expansion unit or "boiler" indicated as a whole by 16. Said expansion unit 16 consists of an expansion chamber 16a and refrigerating coils 16b. It will be understood that passage of liquid refrigerant from the conduit 15 to the expansion chamber 16a may be controlled by a float valve such as 16c within the chamber 16a or by any other liquid control valve recognized in this art. A low pressure or vapor conduit 17 leads from the upper portion of the expansion chamber 16a to the low pressure side of the pistons of the compressor through the pipe connection 18 and pipe section 19 shown as tapped into the crank case of the compressor. The parts thus briefly described are common to refrigerating machines of this type.

It will be understood that it is customary to operate the compressor at such intervals as may be required to keep the temperature of the expansion unit below a predetermined upper limit. The compressor may, for example, be operated until the temperature of the atmosphere immediately surrounding the expansion unit has reached 10° F. The compressor may then be stopped and remain idle until the temperature in the vicinity of the expansion unit has risen to say, 28° or 30° F. Then the compressor may again be started and operated until a temperature of 10° F. has again been reached at the expansion unit. In the embodiment shown this intermittent operation of the compressor may be controlled by a switch 22 in the circuit 20, 21 of the electric motor 11.

It is desirable and customary to have the compressor in refrigerating machines of this type controlled automatically so that when the temperature in the compartment in which the expansion unit is generally enclosed reaches the predetermined lower limit the compressor will stop and remain out of operation until the temperature in said compartment has reached the predetermined higher limit whereupon the compressor will again start.

In the diagram, Fig. 1, the controlling switch 22 is conventionally indicated as a snap switch of previously known construction, and this switch is shown as controlled by operating means indicated as a whole by numeral 23, said operating means being responsive to variations of pressure, which may originate in a fluid bulb thermostat disposed adjacent the expansion unit, or to variations of pressure directly within the refrigerant circuit. The diagram shows the device 23 connected by a branch conduit 24 that is in communication with the low pressure or vapor side of the refrigerant circuit, the pressure in pipe 24 being communicated through an expansible and collapsible diaphragm or bellows 25 to the switch-moving parts of the device.

In Figs. 2 and 3, which show the mechanism of the device 23, it will be understood that the switch 22 is encased in a switch box 26 and that said switch may be opened or closed by any force communicated to it in one direction or another by the switch operating rod 27, the connection of which to the automatically controlled switch operating means will be presently described.

The switch box 26 serves also as a base for supporting the switch operating and controlling means. Extending from one end of said box 26,—the left end as shown in Figs. 2 and 3,—is a platform-like extension 28 from which rises a plurality of rigid standards 29, the upper ends of which are reduced and support a rigid frame 30 which comprises an arm or projection 31 extending over the switch box and a part 32 that overhangs the platform-like extension 28. Threaded studs 33 are formed on the reduced ends of standards 29. These studs pass through holes in the frame 30, and nuts 34 engaging said studs secure the frame rigidly on the standards. Between the supporting standards 29 are two depending bearings 35 each having a V-shaped notch 36 at its lower end. Although Figs. 2 and 3, being side elevations, show only one of these bearings 35, it will be understood that one depends on each side from the member 30 and that an elevation shown from the other side would present the same appearance. There are preferably four of the standards 29. In the space between standards 29 is the tubular metallic bellows 25, the lower end of which is sealed fluid tight to said platform-like extension 28 in any suitable manner but is provided with an opening communicating with the branch pipe 24. The upper end of the bellows 25 is sealed to a head 38 from which an arm 39 extends in a direction generally parallel with the arm 31 of the frame 30 and which is connected to the arm 31 by a link 40. Rising from the head 38 there is a central bearing standard 41 having a V-shaped notch 42 in its upper end, the center or apex line of said notch being parallel with but displaced laterally from the center or apex lines of notches 36 in depending bearings 35. A spring 43 may connect the bellows head 38 with the member 30, this spring exerting its tension in a direction tending to lift the head 38 and expand the bellows. A lever 44, constituting an operating member, is fulcrumed between its ends in the notches 36 by means of knife bearings 45. A knife bearing 46 carried on said lever rests in the notch 42 of the upright bearing 41 which rises from the bellows head 38. At its right end,—viewed as in Figs. 2 and 3,—the lever 44 is pivoted to the switch operating rod 27 before described. On the other end of said lever, as indicated in Figs. 2 and 3, there is an adjustable weight 48 which may be fixed in various points along the arm of the lever by means of a set screw 49. The weighted arm of lever 44 is preferably guided by a guide member 50, here shown as an L-shaped bracket depending from the under side of the extension 32 of frame 30. Said guide member 50 has an elongated slot 51 which serves not only to prevent lateral movements of the lever arm, but also to limit the range of oscillation of the lever 44 so that no undue strains may be transmitted to the snap switch 22 after it has been opened or closed. The structure of the switch operating lever, its mount and connection to the bellows are fully disclosed in the patent to Bechtold and Mellowes, No. 1,478,421, issued December 25, 1923.

As thus far described, it will be apparent that if sufficient pressure is admitted to the bellows 25 the latter will expand and cause the lever 44 to move about the fulcrum on bearings 35, turning the lever so as to raise the weight 48 and to depress the opposite end of said lever thus forcing the rod 27 downward and closing the switch 22; also that decrease of pressure in the bellows 25 will tend to lower that end of the lever which carries the weight 48 and raise the opposite end, thus lifting the rod 27 and opening the switch 22. It will be understood that switch 22 does not make or break contact in the line 20 of the motor circuit until at or near the limits of movement of lever 44 and rod 27, in the manner typical of snap switches.

The invention constituting the subject of this application comprises the combination, with the hereinbefore described parts, of the means now to be explained.

Pivoted at 52 on the upper side of the overhanging extension 32 is an arm 53 upon which there is mounted a weight 54 which is adapted to be slid longitudinally of the arm and may be secured in any desired adjusted position by set screw 55. The arm 53 passes through an opening in a guide bracket 57 which is secured on the upper side of said overhanging extension 32. This guide bracket 57 may be made of sheet metal having struck-up bearings 58 between which the arm 53 is pivoted. Both the bracket 57 for guiding arm 53 and the bracket 50 for guiding the weighted arm of lever 44 are preferably secured by bolts 59. Arm 53 extends above the weighted arm of lever 44 and projects in the same general direction. The amplitude of movement of lever 44 is such that before it reaches the upper limit of its oscillation and before it has closed switch 22, the weight 48 will contact with the weight 54 which will then add its resistance to that of the weight 48 and delay movement of the lever 44 so that the switch 22 will be opened only under a higher pressure than it would be otherwise.

By adjusting the weight 48 toward the end of the lever 44, it will be apparent that switch 22 will open when the pressure in bellows 25 is at a certain predetermined low pressure, and that by moving the weight 48 nearer to the fulcrum the switch will open when the pressure in bellows 25 is at a still lower pressure; likewise, that the difference between opening and closing pressure may be varied by adjusting the weight 48. For example, adjusting the weight 48 to the left—as viewed in Figs. 2 and 3—will cause a greater differential of pressure for stopping and starting the compressor than adjusting it to the right. It will also be apparent that with the adjustable weight 48 alone controlling the opening and closing of the switch, the pressure that closes the switch cannot be varied without also varying the pressure that opens it. By adding to the weight 48 toward the end of its upward movement the resistance or weight 54, it will be seen that the switch may be set to close at any desired pressure without changing the setting for opening the switch which will, in this event, open always at the same pressure. The weight 54 adds a non-elastic resistance to the movement of arm 44, this resistance remaining substantially constant throughout the range of movement of arm 44 after it has picked up said weight.

It will be understood that in usual practice the expansion unit will be inclosed in the refrigerating compartment of a refrigerator cabinet. The other parts may be outside of the cabinet or inclosed in a compartment adapted to receive them. The bellows 25 and associated parts will be so constructed, proportioned and arranged that, within the range of adjustment of the weight 48 upon the attainment of any predetermined low temperature desired at the expansion unit, the switch 22 will be opened and the compressor stopped. The pipe 24 and bellows 25, in the particular embodiment illustrated, contain vaporous refrigerant, under the same pressure as that which exists in the low pressure or return conduits 17 and 19. The pressure in these conduits is of course relatively low when the temperature is low at the expansion unit, the said pressure and temperature bearing in general a definite relationship. When the pressure in the low or vapor side has become reduced during the operation to the point at which the weight 48 will overcome the resistance within the bellows 25 and elsewhere in the switch operating mechanism and switch, the bellows will of course collapse and allow the weight 48 to oscillate the lever 44 so as to lift the rod 27 and open the switch 22 thus stopping the compressor. The weight 48 will be adjusted so that the switch will open at a lower or higher limit of pressure (and temperature) as may be desired. It will be apparent that when the weight 48 is given a certain adjustment it will, under normal conditions, operate under a definite differential of pressure communicated to the bellows 25, and that it is not possible by use of the single lever 44 and weight 48 shown to maintain one limit of operation and vary the other. If, for example, the weight 48 were so adjusted as to collapse the bellows when the pressure therein is at eight inches vacuum so as to open the switch, and to expand the bellows and open the switch when the pressure has risen to eight pounds gauge pressure, it could not be set so that the switch would open only when twelve pounds gauge pressure is reached, but would close at eight inches vacuum as before. In order that the device may be set to operate always at the same low pressure but at different higher pressures, an additional adjustable resistance is provided in the auxiliary weight 54. Before the weight 48 on switch operating lever 44 moves far enough to close the switch, it picks up the load of weight 54. A corresponding increase of pressure must be built up within the bellows 25 before the switch will be closed.

The weights may be set so that the switch will close and start the compressor at a pressure corresponding say, under normal conditions, to a temperature of 28° F. at the expansion unit and to open and stop the compressor at a temperature say, of 10° F. If now it is desired to allow the temperature to rise higher than 28° F. before starting the compressor, but not to vary the lower limit for stopping it, then the weight 54 should be adjusted so as to impose upon the lever 44 and weight 48 a sufficient additional resistance to permit the vapor pressure in the bellows to rise to a point corresponding in general to the higher temperature at the unit. Thus the high range at which the compressor will start may be varied at will while the low range may be kept the same.

It will be clear that this flexibility of range is useful in many ways. For example, by setting the weights so that the temperature at the expanding unit will rise above the freezing point before starting the compressor, the expanding unit may be defrosted, or the ice formed therein melted away before the compressor starts again to reduce the temperature at the coil. The weight 54 can, of course, be adjusted at any time, so that after once the expanding unit has been defrosted the adjustment may be changed back to give a differential always below the freezing point if desired.

Although the bellows 25 is shown subject to pressure in the return or low pressure conductor of the circulating system, it is apparent that it might be connected to the known thermostatic bulb containing a volatile fluid arranged in the refrigerating compartment or adjacent the expansion unit.

An auxiliary resistance element associated with a starting and stopping lever such as 44, effects results that are particularly useful in refrigerating machines wherein the starting and stopping of the compressor is effected by the pressure within the low pressure side of the refrigerant circulating system. As an example of particular utility in this combination, it is explained that it may sometimes happen that while the compressor is idle pressure leaks from the high pressure side of the compressor, as through the check valves in the compression chamber, and gradually raises the pressure in the conductors 18 and 19 above what it would reach by reason of the gradual rise in temperature of the expanding unit. Should this occur, the compressor would start before the temperature of the expanding unit had risen to the point at which it was intended to be started. As a result, the periods of stopping and starting would be too frequent and the average temperature perhaps too low within the cabinet. Without a regulating or compensating means capable of modifying the action in the manner described, low pressure control has been found unreliable.

While I have described and shown a preferred embodiment of my invention adapted to operate an electric switch, it will be understood that various changes may be made within the scope of the appended claims without departing from the spirit thereof, and that it is not limited to the operating of switches.

What I claim and desire to secure by Letters Patent of the United States is:

1. Refrigerating apparatus comprising, in combination, a compressor; a motor for operating said compressor; a refrigerant-circulatory system having a high pressure side for receiving refrigerant under pressure from the compressor and having a low pressure side for returning the refrigerant to the compressor, said low pressure side including an evaporator; a float actuated valve responsive to the quantity of refrigerant in said low pressure side for controlling the passage of refrigerant from the high pressure side to the evaporator; and adjustable control means for the motor, responsive to the pressure within said low side, for varying the upper and lower temperature limits of the evaporator independently of one another.

2. Refrigerating apparatus comprising a system having a low pressure side and a high pressure side, means for circulating refrigerant through said system, said low pressure side including an evaporator of the type having a float actuated valve responsive to the quantity of refrigerant in the low pressure side for controlling the flow of refrigerant from the high pressure side to the evaporator, and adjustable control means for the circulatory means, responsive to the pressure within said low pressure side, for varying the upper and lower temperature limits of the evaporator independently of one another.

3. A system having a low pressure side and a high pressure side, means for circulating refrigerant through said system, said low pressure side including an evaporator having a plurality of refrigerant ducts and having a supply reservoir for said ducts, said supply reservoir being directly connected with the high pressure side, a float actuated valve responsive to the quantity of refrigerant within the reservoir for controlling the flow of refrigerant from the high pressure side to the reservoir, and adjustable control means for the circulating means responsive to the pressure within said low pressure side, for varying the upper and lower temperature limits of the evaporator independently of one another.

In testimony whereof I hereto affix my signature.

JESSE G. KING.